United States Patent Office 2,916,344
Patented Dec. 8, 1959

2,916,344

RESCUE MARKER FOR WATER-BORNE OBJECTS

Ira Kukin, Bronx, and Henry Sonneborn III, Larchmont, N.Y., assignors to L. Sonneborn Sons, Inc., a corporation of Delaware No Drawing. Application May 20, 1957
Serial No. 660,066

12 Claims. (Cl. 8—3)

This invention is a new and useful rescue marker for water-borne objects.

Rescue markers also known as soluble dyes of the general type to which the invention relates are known and consists essentially of a small packet of water-soluble dye in some form in which the dye is released on contact of the packet with water, thereby imparting an easily visible area of color immediately surrounding the point of release. Such markers are used to facilitate the location of downed pilots, life rafts, etc. They may also be attached to life preservers, life rings, etc. to facilitate the location of a man or device swept overboard from a vessel. The dyes ordinarily used are of the sodium fluorescein type and these are subject to the disadvantages that the rate of release is not accurately controllable and the dye does not remain at the surface of the water surrounding the point of release, but tends to sink and become lost to sight. This invention is a device by which the rate of release of the dye may be accurately controlled and by which the dye may be held at the surface adjacent the point of release.

In accordance with our invention the first step is to absorb and/or adsorb a quantity of water-soluble dyestuff on a finely divided, inorganic absorbent carrier, preferably a form of colloidal silica. Diatomaceous earth may be used but we prefer an even more colloidal form, such as that produced by the controlled hydrolysis of of silicon tetrachloride, or the form produced by burning silicon tetrachloride in an oxyhydrogen flame and which has a surface area of about 200 square meters per gram.

The dye may be incorporated with the carrier by mixing or mulling to a point where the dye is uniformly distributed throughout the carrier. However, we prefer to dissolve the dye in the minimum quantity of water that will bring the dye completely in solution and then admix the carrier with the solution and evaporate, if desired, to dryness. The dye may vary in general from one-quarter up to equal amounts by weight, based on the weight of the carrier and the amount of carrier surface. With the colloidal silica hereinabove referred to produced by burning silicon tetrachloride in an oxyhydrogen flame, the carrier will effectively absorb and/or adsorb up to an equal weight of the dyestuff.

Following this we dissolve an oil-soluble emulsifying agent in wax, in amount sufficient to form a homogeneous mixture when the absorbed dye is added to the wax. Although other waxes, such as montan wax or ceresin may be used, we prefer microcrystalline or paraffin waxes derived from petroleum, and as emulsifying agent we prefer a sodium petroleum sulfonate. The amount of sulfonate may vary from .05–2.5% by weight of the wax and is preferably incorporated into the wax while the latter is molten.

The carrier and absorbed dyestuff are then incorporated into the sulfonate wax mixture. The wax may, for example, vary from 1–10 times by weight of the carrier plus dyestuff. It should not, however, be in excess of that amount which will yield a friable product since the product must be further reduced by grinding. On mixing, the dyestuff becomes to a large extent solubilized in the wax as a result of the action of the oil soluble emulsifying agent.

In grinding we find it necessary, or at least advisable, to introduce a further quantity of inorganic absorbent, such as diatomaceous earth, or other finely divided inorganic material. The amount may vary from about 50 to about 200% of the combined weight of wax, emulsified agent, dye and previously added carrier. Although it is possible to subdivide the composition without this addition, it will not retain this degree of subdivision in storage, especially at elevated, ambient temperatures. With such addition, however, it will retain the subdivision imparted to it by grinding, indefinitely, and will not cake or consolidate.

We further find it preferable to add at some time prior to the final grinding, cetyl alcohol. This may be added to the extent of from 10–100% of the other materials present. We may also incorporate an additional amount of the free dyestuff to give an immediate release on contact with water.

The finished composition is then subdivided into quantities required for an individual rescue marker and packaged in an envelope that is either water-soluble or open to water. On contact of such a package with water, a sustained and controlled release of the water-soluble dye is effected. The rate of release is speeded by the incorporation of larger amounts of the oil-soluble emulsifying agent. The cetyl alcohol moreover operates to hold the dye so released for long periods at the surface of the water by virtue of the preferential adsorption of the dye on the micro platelets of the cetyl alcohol. Rescue markers made in accordance with the invention continue to function effectively for periods up to 24 hours or longer following initial contact with water.

We claim:

1. A rescue marker of the type releasing a dyestuff on contact with water, comprising a water-soluble dye absorbed on a finely divided, inorganic solid material, said material and dye incorporated in a wax containing dissolved oil-soluble emulsifying agent.

2. A rescue marker according to claim 1 in which the oil-soluble emulsifying agent is sodium petroleum sulfonate.

3. A rescue marker according to claim 1 in which the inorganic solid material is colloidal silica.

4. A rescue marker according to claim 1 in which the finely divided, inorganic solid material is colloidal silica and the oil-soluble emulsifying agent is sodium petroleum sulfonate.

5. A rescue marker of the type releasing a dyestuff on contact with water, comprising a water-soluble dye absorbed on a finely divided, inorganic solid material, said material and dye being incorporated in a wax containing dissolved oil-soluble emulsifying agent, all in subdivided form, containing additional finely divided inorganic material in amount sufficient to impart stability against consolidation on storage.

6. A rescue marker according to claim 5 in which the oil-soluble emulsifying agent is sodium petroleum sulfonate.

7. A rescue marker according to claim 5 in which the inorganic solid material is colloidal silica.

8. A rescue marker according to claim 5 in which the finely divided, inorganic solid material is colloidal silica and the oil-soluble emulsifying agent is sodium petroleum sulfonate.

9. A rescue marker according to claim 1 containing, in addition, cetyl alcohol.

10. A rescue marker according to claim 1 containing, in addition, cetyl alcohol to the extent of from 10–100% of the total.

11. A rescue marker of the type releasing a dyestuff on contact with water, comprising a water-soluble dye absorbed on finely divided colloidal silica, said silica and dye being incorporated in a wax containing dissolved sodium petroleum sulfonate and also containing cetyl alcohol to the extent of from 10–100%.

12. A composition according to claim 11 in subdivided form containing additional finely divided inorganic material in amount sufficient to impart stability against consolidation.

References Cited in the file of this patent
UNITED STATES PATENTS

| | | |
|---|---|---|
| 2,675,776 | Tuve | Apr. 20, 1954 |
| 2,764,499 | Porter | Sept. 25, 1956 |